Aug. 14, 1962　　　　J. M. S. KEEN　　　　3,048,975
JET PROPULSION ENGINES
Filed Nov. 14, 1960　　　　　　　　　　2 Sheets-Sheet 1

John Michael Storer Keen
Inventor

By
Cushman, Darby & Cushman
Attorneys

Aug. 14, 1962 J. M. S. KEEN 3,048,975
JET PROPULSION ENGINES
Filed Nov. 14, 1960 2 Sheets-Sheet 2

John Michael Storer Keen
Inventor

By
Cushman, Darby & Cushman
Attorneys 3,048,975
JET PROPULSION ENGINES
John Michael Storer Keen, Allestree, Derby, England, assignor to Rolls-Royce Limited, Derby, England, a company of Great Britain
Filed Nov. 14, 1960, Ser. No. 68,711
Claims priority, application Great Britain Nov. 19, 1959
4 Claims. (Cl. 60—35.54)

This invention concerns improvements in or relating to jet propulsion engines.

According to the present invention a jet propulsion engine is provided with a silencer and a thrust reverser, the silencer comprising a plurality of angularly spaced apart air ducts which are disposed at the downstream end of the jet pipe and which project into the jet path therethrough, and the thrust reverser comprising a plurality of thrust reverser members and means for moving the thrust reverser members between an inoperative position in which they are disposed about the jet pipe but permit air flow through said air ducts and an operative position in which they are disposed downstream of the jet pipe and serve to deflect the jet.

It will be appreciated that, irrespective of whether the thrust reverser members are disposed in their operative or inoperative position, air may always, in flight, flow through the said air ducts. This ensures that the mixing of the jet gases and the atmospheric air occurs over a large boundary and that silencing is therefore effected. Accordingly the present invention provides a jet propulsion engine whose thrust reverser does not impair the operation of its silencer.

Preferably when the thrust reverser members are in the inoperative position, they define with the jet pipe a chamber which is open both to atmospheric air and to the said air ducts.

The chamber is preferably annular or part annular and is supplied with atmospheric air by a plurality of angularly spaced apart air passages which extend through a nacelle within which the engine is mounted.

There may be a plurality of channel members which are angularly spaced from each other within the downstream end of the jet pipe, said channel members defining with the jet pipe the said air ducts, the channel members being open at their downstream ends and the jet pipe having holes therethrough which communicate with the interior of the channel members.

There may be two pivotally mounted part-cylindrical thrust reverser members and the means for moving these members between the operative and the inoperative positions may comprise pneumatically operated jacks.

Figure 1:
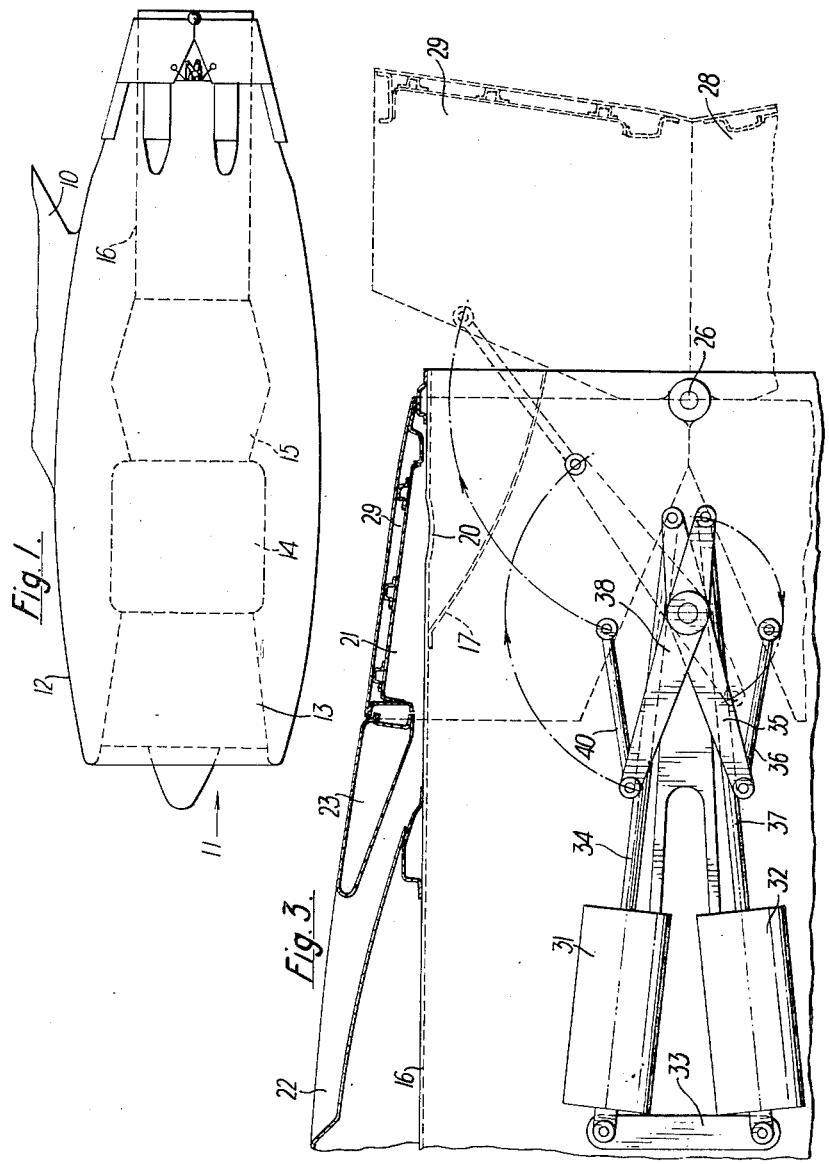
Figure 2:
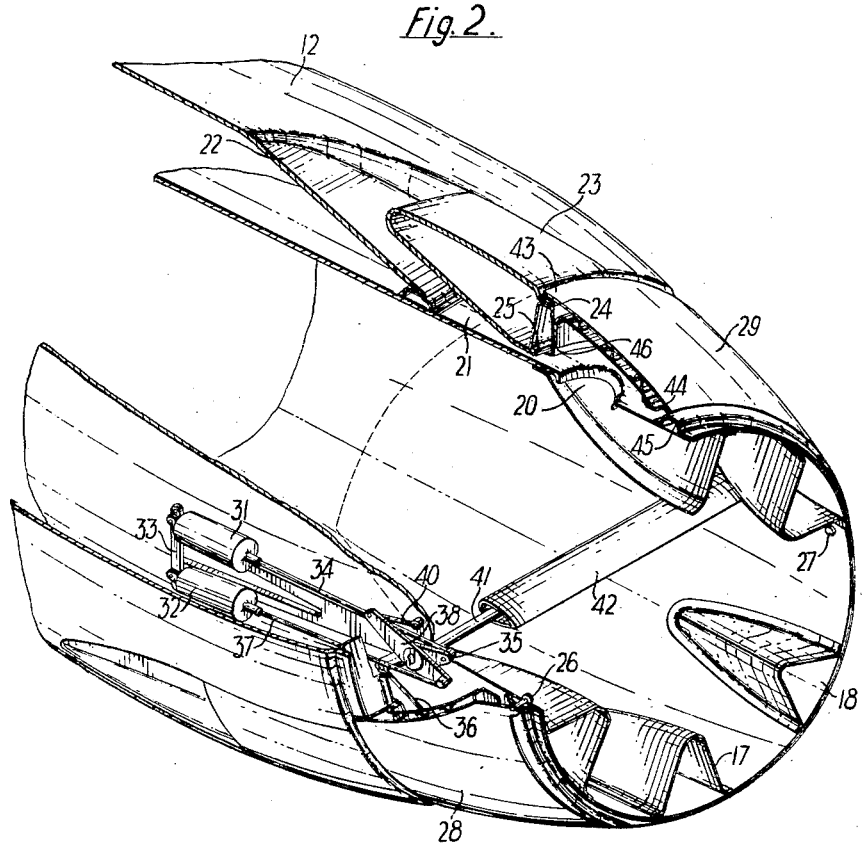

The invention is illustrated, merely by way of example, in the accompanying drawings, in which:

FIGURE 1 is a diagrammatic elevation of a jet propulsion engine according to the invention installed in an aircraft wing, FIGURE 2 is a broken away perspective view of part of the engine shown in FIGURE 1, the thrust reverser members being shown in their inoperative position, and FIGURE 3 is a broken away sectional elevation of the part of the engine shown in FIGURE 2, the thrust reverser members being shown both in their operative and in their inoperative positions.

Referring to the drawings, there is installed in an aircraft wing 10 a gas turbine jet propulsion engine 11 mounted within a nacelle 12. The engine 11 comprises in flow series a compressor 13, combustion equipment 14, and turbine 15, the turbine exhaust gases being discharged through a jet pipe 16.

Mounted at and within the downstream end of the jet pipe 16 are a plurality of channel members 17 which are angularly spaced apart from each other. The channel members 17 define with the jet pipe 16 a plurality of angularly spaced apart air ducts 18 each of which increases in cross sectional area in a downstream direction, is closed at its upstream end and is open at its downstream end.

The jet pipe 16 is perforated with holes 20 which communicate both with the air ducts 18 and with an annular plenum chamber 21. The plenum chamber 21 is supplied with atmospheric air by way of six, angularly spaced apart, air passages 22. Each air passage 22 has mounted within it a hollow baffle member 23 for guiding the atmospheric air into the plenum chamber 21, the downstream end of each baffle member 23 being provided with axially extending flanges 24, 25 which are radially spaced from each other. The total area of the inlet air passages 22 to the plenum chamber 21 is greater than the total area of the holes 20 for the outlet air ducts 18.

Mounted on pivots 26, 27 at the downstream end of the jet pipe 16 are two flap members 28, 29. Each of the flap members is substantially of part-cylindrical shape and the two flap members together constitute a thrust reverser.

The flap members 28, 29 are movable by a pair of pneumatic jacks which are mounted on diametrically opposite sides of the jet pipe 16. Only one such pair of jacks, however, namely jacks 31 and 32, are illustrated in the drawings. The jacks serve to move the flap members 28, 29 between an inoperative position (shown in full lines in FIGURE 3) in which they form a continuation of the nacelle 12 and an operative position (illustrated in dotted lines in FIGURE 3) in which they are disposed downstream of the jet pipe and in which they deflect the jet gases radially and forwardly so as to effect a braking action on the aircraft.

The jacks 31, 32 are pivotally mounted on a bar 33 which is secured to the exterior of the jet pipe 16. The jack 31 has a rod 34 which is pivotally connected to one end of a lever 35, the other end of the lever 35 being connected to the flap member 28 by a link 36. Similarly, the jack 32 has a rod 37 which is pivotally connected to one end of a lever 38, the other end of the lever 38 being connected to the flap member 29 by a link 40.

The levers 35, 38 are pivotally mounted on a common bar 41 which extends diametrically of the jet pipe so as to serve as a pivot for the levers (not shown) of the said other pair of pneumatic jacks. The bar 41 is shrouded by a fairing 42 so as to reduce turbulence within the jet pipe.

Each of the flap members 28, 29 is of sheet metal construction and has flanges 43, 44 which, in the inoperative position of the flap members, are respectively disposed against the flange 24 and against a channel shaped annular member 45 which is welded to the downstream end of the jet pipe. Each of the flap members also has a flange 46 which, in the said inoperative position, is disposed against the flange 25. Accordingly in the said inoperative position, the flap members 28, 29 form one wall of the plenum chamber 21.

When the engine is in normal forward flight, the flap members 28, 29 are in the inoperative position. Even when they are so disposed, however, they will not obstruct the free flow of atmospheric air through the passages 22, plenum chamber 21, and ducts 18 so as to mix with the jet gases at the downstream end of the jet pipe. The boundary area between the atmospheric air and jet gases in which this mixing occurs will therefore be large with a consequent reduction in jet noise.

Accordingly, the provision of the thrust reverser constituted by the flap members 28, 29, does not impair the silencing afforded by the ducts 18.

I claim:
1. In a jet propulsion engine: a jet pipe, a silencer carried by said jet pipe, said silencer comprising an annular plenum chamber surrounding said jet pipe upstream of the jet pipe discharge end, said plenum chamber having air inlet means opening peripherally of and extending angularly around the engine for supplying ambient air to the plenum chamber, said plenum chamber having a plurality of angularly spaced air outlet means, said air inlet means having a greater total effective area than said air outlet means so that when the engine is moving forwardly the pressure within said plenum chamber is greater than atmospheric pressure, a plurality of angularly spaced air ducts provided on the interior of said jet pipe at the downstream end thereof and projecting inwardly of said jet pipe, said air ducts receiving air from said air outlet means and having a discharge opening in a downstream direction whereby air flow from the discharge opening of each of said air ducts is substantially uniform regardless of attitude of the jet propulsion engine.

2. The jet propulsion engine of claim 1 wherein said air ducts have a progressively increasing cross-sectional area in a downstream direction.

3. In a jet propulsion engine: a jet pipe, a silencer and a thrust reverser carried by said jet pipe, said silencer comprising an annular plenum chamber surrounding said jet pipe upstream of the jet pipe discharge end, said plenum chamber having air inlet means opening peripherally of and extending angularly around the engine for supplying ambient air to the plenum chamber, said plenum chamber having a plurality of angularly spaced air outlet means, said air inlet means having a greater total effective area than said air outlet means so that when the engine is moving forwardly the pressure within said plenum chamber is greater than atmospheric pressure, a plurality of angularly spaced air ducts provided on the interior of said jet pipe at the downstream end thereof and projecting inwardly of said jet pipe, said air ducts receiving air from said air outlet means and having a discharge opening in a downstream direction whereby the air flow from the discharge opening of each of said air ducts is substantially uniform regardless of attitude of the jet propulsion engine, said thrust reverser means comprising a plurality of thrust reverser members, said thrust reverser members forming at least a portion of a wall of said plenum chamber when in an inoperative position, means for moving said thrust reverser members between an inoperative position in which they are disposed about said jet pipe and permit air flow by said intake means and said plenum chamber through said air ducts and an operative jet deflecting position in which they are disposed downstream of the discharge end of said jet pipe.

4. The jet propulsion engine of claim 3 wherein said plurality of thrust reverser members include two pivotally mounted part-cylindrical members, and wherein said means for moving said thrust reverser members include pneumatically operated jacks operatively connected to each part-cylindrical member.

References Cited in the file of this patent
UNITED STATES PATENTS

| | | |
|---|---|---|
| 2,886,946 | Parker | May 19, 1959 |
| 2,940,252 | Reinhart | June 14, 1960 |
| 2,968,150 | Goebel et al. | Jan. 17, 1961 |